(12) United States Patent
Vishwakarma et al.

(10) Patent No.: US 11,334,139 B1
(45) Date of Patent: May 17, 2022

(54) POWER STATE CONTROL FOR MULTI-CHANNEL INTERFACES

(71) Applicant: SEMICONDUCTOR COMPONENTS INDUSTRIES, LLC, Phoenix, AZ (US)

(72) Inventors: Manish Kumar Vishwakarma, Azamgarh (IN); Athar Ali Khan P, Bangalore (IN); Rajiv Pandey, Bangalore (IN)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 0 days.

(21) Appl. No.: 17/247,095

(22) Filed: Nov. 30, 2020

(51) Int. Cl.
*G06F 1/3206* (2019.01)
*G06F 1/3234* (2019.01)
*H04L 12/40* (2006.01)
*G06F 13/42* (2006.01)
*H04L 12/12* (2006.01)
*H04L 25/49* (2006.01)

(52) U.S. Cl.
CPC .......... *G06F 1/3206* (2013.01); *G06F 1/3234* (2013.01); *G06F 1/3253* (2013.01); *G06F 13/4282* (2013.01); *H04L 12/12* (2013.01); *H04L 12/40039* (2013.01); *H04L 25/4902* (2013.01); *G06F 2213/0042* (2013.01)

(58) Field of Classification Search
CPC .... G06F 1/3234; G06F 1/3253; G06F 1/3206; G06F 13/4282; G06F 2213/0042; H04L 25/4902; H04L 12/12; H04L 12/40039
See application file for complete search history.

(56) References Cited

U.S. PATENT DOCUMENTS

| | | | |
|---|---|---|---|
| 9,559,905 B2 | 1/2017 | Chen | |
| 9,952,996 B2 | 4/2018 | Hundal | |
| 10,802,566 B1* | 10/2020 | Lam | G06F 1/3218 |
| 2005/0134321 A1* | 6/2005 | Ede | G06F 1/3253 |
| | | | 327/1 |
| 2012/0311359 A1 | 12/2012 | Jaramillo | |
| 2015/0378952 A1 | 12/2015 | Chen | |
| 2019/0340146 A1* | 11/2019 | Chen | G06F 13/4072 |
| 2021/0064558 A1* | 3/2021 | Tseng | G06F 13/4068 |

OTHER PUBLICATIONS

TUSB1146 USB Type-C DisplayPort Alt Mode 10-Gbps Linear Redriver Crosspoint Switch, Apr. 2020, Texas Instruments.
Morten Christiansen, USB 3.2: The Latest USB Type-C Challenge for SoC Designers, White paper, Aug. 2018, pp. 1-6, Synopsys.

* cited by examiner

*Primary Examiner* — Glenn A. Auve
(74) *Attorney, Agent, or Firm* — Dickinson Wright PLLC

(57) ABSTRACT

Various embodiments of the present technology may provide methods and apparatus for an interface having a first bi-directional channel and a second bi-directional channel. The interface operates in one of a first operational state and a second operational state, and performs an exemplary power-saving scheme if it is operating in the second operational state. The interface may detect a plurality of power states and initiate the power-saving scheme based on the detected power state. The plurality of power states may comprise a first power state (low current mode), a second power state (high current mode), and a third power state (mid-current mode).

20 Claims, 4 Drawing Sheets

US 11,334,139 B1

POWER STATE CONTROL FOR MULTI-CHANNEL INTERFACES

BACKGROUND OF THE TECHNOLOGY

Serial communications/interconnect protocols such as the Universal Serial Bus (USB) protocol provide efficient mechanisms to communicate between different devices. USB protocols can include standards that define signal properties, timing, and state changes required for compatibility with the protocols. USB 3.2 is a new generation of USB protocols and offers a 20 Gbps data rate by using two communications channels of 10 Gbps simultaneously. With such advances in speed, however, come more complex design challenges as increasing data rates can lead to increasingly stringent signal properties and can also be at odds with the desire for lower power consumption.

Although the USB 3.2 protocol preserves some earlier USB concepts in that it is backward compatible with USB 3.1/3.0 and USB 2.0, its interface is different. The interface of the USB 3.2 protocol comprises dual-channel architecture in that it defines a physically separate channel to carry additional USB traffic. In order to achieve high-speed data transmission rates, such as 20 Gbps, without sacrificing signal integrity, the separate channel is typically kept in a high power consuming active state.

Just as signal integrity is important given the high data rate of USB 3.2, low power consumption is also important given the fact that many mobile devices such as laptops, cell phones, portable gaming systems, and the like, use protocols such as USB 3.2.

Conventional methods for reducing power consumption in protocols having single-channel architecture like USB 2.0, 3.0, and 3.1 involve placing portions of its transmitter and/or receiver circuits into a low power state, but they have not sufficiently addressed the need to reduce power consumption in an interface comprising a dual-channel architecture owing to their incompatibility and the increased sophistication and complexity of the dual-channel architecture.

SUMMARY OF THE TECHNOLOGY

Various embodiments of the present technology may provide methods and apparatus for an interface having a first bi-directional channel and a second bi-directional channel. The interface operates in one of a first operational state and a second operational state, and performs an exemplary power-saving scheme if it is operating in the second operational state. The interface may detect a plurality of power states and initiate the power-saving scheme based on the detected power state. The plurality of power states may comprise a first power state (low current mode), a second power state (high current mode), and a third power state (mid-current mode).

BRIEF DESCRIPTION OF THE FIGURES

A more complete understanding of the present technology may be derived by referring to the detailed description and claims when considered in connection with the following illustrative figures. In the following figures, like reference numbers refer to similar elements and steps throughout the figures.

DETAILED DESCRIPTION OF EXEMPLARY EMBODIMENTS

The present technology may be described in terms of functional block components and various processing steps. Such functional blocks may be realized by any number of components configured to perform the specified functions and achieve the various results. For example, the present technology may employ various communications channels, receivers, transmitters, circuitry, state machines, timers, and the like, which may carry out a variety of functions. In addition, the present technology may be practiced in conjunction with any number of dual-channel interfaces, and the system described is merely one exemplary application for the technology.

Methods and apparatus for an interface according to various aspects of the present technology may operate in conjunction with any system configured to provide communication between a host device and a sink device. In addition, the interface may operate in conjunction with any suitable power saving system, such as power saving systems used in USB 3.1/3.0 interface applications, USB 2.0 interface applications, and the like.

Aspects of the present disclosure are directed toward devices that may be used in connection with a USB protocol and with the USB 3.2 protocol in particular. Although not necessarily limited thereto, much of the following discussion is presented in the context of the USB 3.2 protocol.

Figure 1:
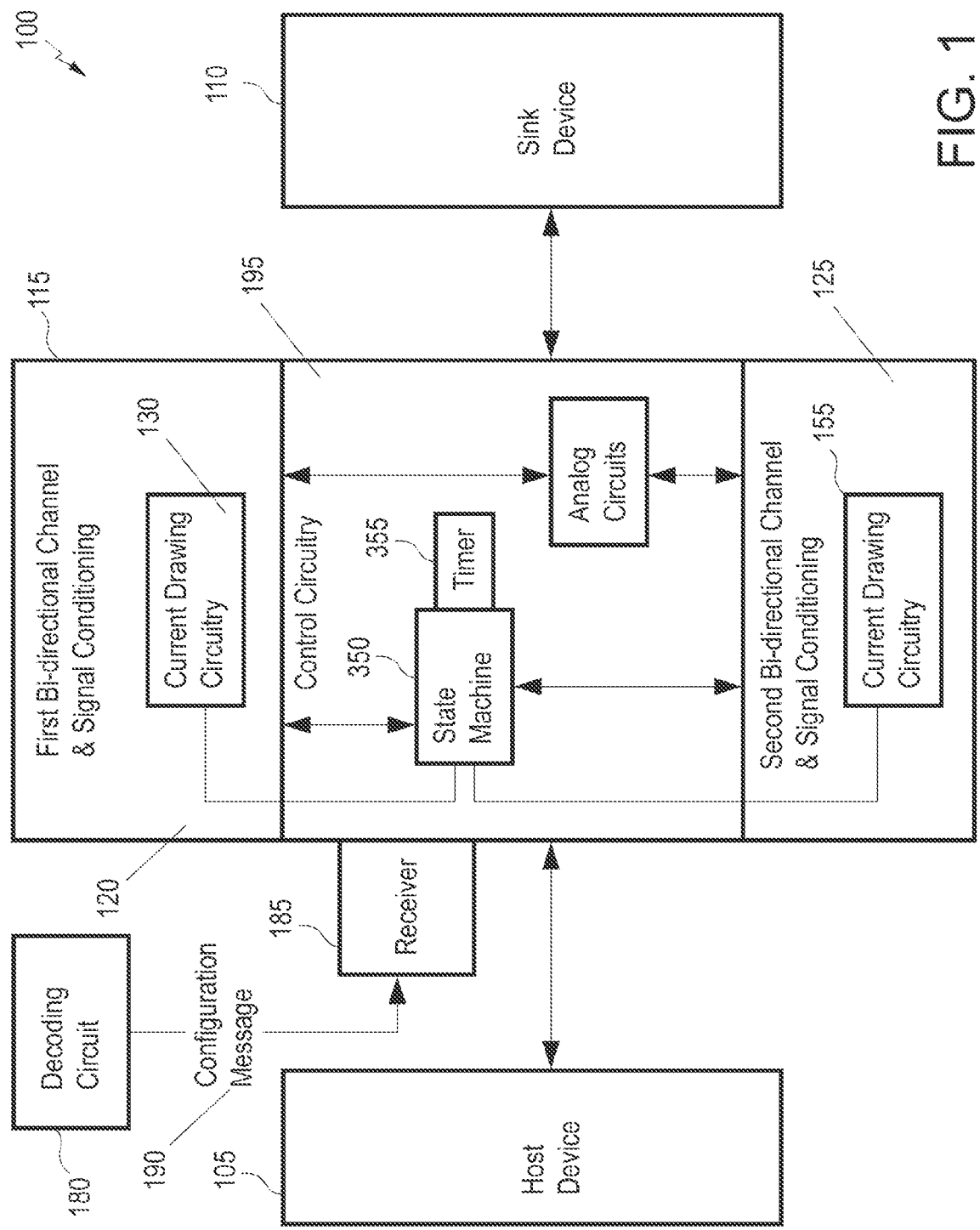
FIG. 1 representatively illustrates a block diagram of a system in accordance with an exemplary embodiment of the present technology.
Figure 2:
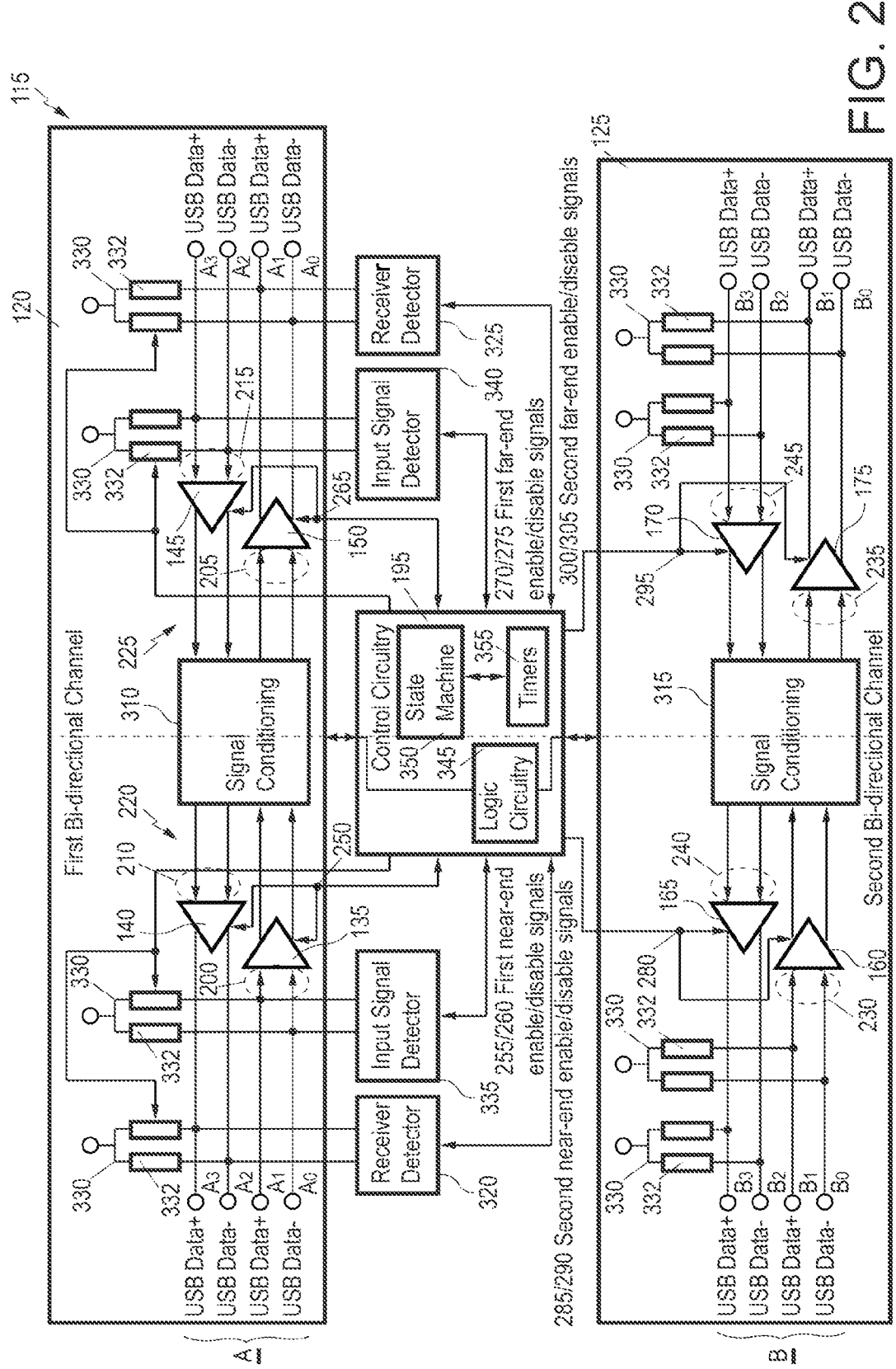
FIG. 2 representatively illustrates a block diagram of an interface in accordance with an exemplary embodiment of the present technology.

Referring to FIGS. 1 and 2, an exemplary system 100 may comprise a host device 105 (e.g., a computer) designed to communicate with a sink device 110 (e.g., a storage device or similar peripheral device) via an interface 115 comprising a first bi-directional channel 120 and a second bi-directional channel 125.

Each bi-directional channel 120, 125 may be configured to receive data packets to allow the host device 105 and the sink device 110 to communicate with each other. For example, the first bi-directional channel 120 may comprise first current drawing circuitry 130 comprising a first near-end receiver 135 and a first near-end transmitter 140 connected in parallel and a first far-end receiver 145 and a first far-end transmitter 150 connected in parallel. Similarly, the second bi-directional channel 125 may comprise second current drawing circuitry 155 comprising a second near-end receiver 160 and a second near-end transmitter 165 connected in parallel and a second far-end receiver 170 and a second far-end transmitter 175 connected in parallel.

The system 100 may also comprise a decoding circuit 180 and a receiver 185 connected to the interface 115 for receiving a configuration message 190 from the decoding circuit 180. The configuration message 190 may provide instructions to the interface 115 on one or more operational states to be entered in response to the receipt of the configuration message 190.

The system 100 may further comprise control circuitry 195 configured to send the interface 115 into the one or more operational states in response to receiving the configuration message 190 at the receiver 185. The control circuitry 195 may be further configured to detect a plurality of power states for the interface 115 and perform an exemplary power-saving scheme if the interface 115 enters a particular operational state.

Referring now to FIG. 2, in an exemplary embodiment of the present technology, the first bi-directional channel 120 may comprise a first group of two signal line pairs, A, comprising four signal lines, A0, A1, A2, and A3. Signal lines A0, A1 may be connected to the first near-end receiver 135 at a first near-end signal port 200 and the first far-end transmitter 150 at a first far-end signal port 205. Signal lines A2, A3 may be connected to the first near-end transmitter 140 at a second near-end signal port 210 and the first far-end receiver 145 at a second far-end signal port 215. As described herein, a near-end 220 of the first and second bi-directional channels 120, 125 may be an end of the first and second bi-directional channels 120, 125 that is closest to the host device 105, and a far-end 225 of the first and second bi-directional channels 120, 125 may be an end of the first and second bi-directional channels 120, 125 that is farthest from the host device 105.

Similarly, the second bi-directional channel 125 may comprise a second group of two signal line pairs, B, comprising four signal lines, B0, B1, B2, and B3. Signal lines B0, B1 may be connected to the second near-end receiver 160 at a third near-end signal port 230 and the second far-end transmitter 175 at a third far-end signal port 235. Signal lines B2, B3 may be connected to the second near-end transmitter 165 at a fourth near-end signal port 240 and the second far-end receiver 170 at a fourth far-end signal port 245.

The first and second near-end signal ports 200, 210 may be connected to a first near-end control port 250. The first near-end control port 250 may be connected to the control circuitry 195 for receiving a first near-end enable signal 255 and a first near-end disable signal 260. The first near-end control port 250 may be configured to enable and disable the first and second near-end signal ports 200, 210 in response to receiving the first near-end enable signal 255 and the first near-end disable signal 260, respectively.

In other embodiments, each near-end signal port 200, 210 may be configured to receive and respond to its own respective enable signal and disable signal, wherein the enable signal and the disable signal received at the first near-end signal port 200 may be different than the enable signal and the disable signal received at the second near-end signal port 210, respectively.

The first and second far-end signal ports 205, 215 may be connected to a first far-end control port 265. The first far-end control port 265 may be connected to the control circuitry 195 for receiving a first far-end enable signal 270 and a first far-end disable signal 275. The first far-end control port 265 may be configured to enable and disable the first and second far-end signal ports 205, 215 in response to receiving the first far-end enable signal 270 and the first far-end disable signal 275, respectively.

In other embodiments, each far-end signal port 205, 215 may be configured to receive and respond to its own respective enable signal and disable signal, wherein the enable signal and the disable signal received at the first far-end signal port 205 may be different than the enable signal and the disable signal received at the second far-end signal port 215, respectively.

The third and fourth near-end signal ports 230, 240 may be connected to a second near-end control port 280. The second near-end control port 280 may be connected to the control circuitry 195 for receiving a second near-end enable signal 285 and a second near-end disable signal 290. The second near-end control port 280 may be configured to enable and disable the third and fourth near-end signal ports 230, 240 in response to receiving the second near-end enable signal 285 and the second near-end disable signal 290, respectively.

In other embodiments, each near-end signal port 230, 240 may be configured to receive and respond to its own respective enable signal and disable signal, wherein the enable signal and the disable signal received at the third near-end signal port 230 may be different than the enable signal and the disable signal received at the fourth near-end signal port 240, respectively.

The third and fourth far-end signal ports 235, 245 may be connected to a second far-end control port 295. The second far-end control port 295 may be connected to the control circuitry 195 for receiving a second far-end enable signal 300 and a second far-end disable signal 305. The second far-end control port 295 may be configured to enable and disable the third and fourth far-end signal ports 235, 245 in response to receiving the second far-end enable signal 300 and the second far-end disable signal 305, respectively.

In other embodiments, each far-end signal port 235, 245 may be configured to receive and respond to its own respective enable signal and disable signal, wherein the enable signal and the disable signal received at the third far-end signal port 235 may be different than the enable signal and the disable signal received at the fourth far-end signal port 245, respectively.

In various embodiments, the first and second bi-directional channels 120, 125 may be USB 3.2 channels, wherein each group of two signal line pairs A, B may be referred to as SuperSpeed USB differential signal line pairs, represented by USB data+ lines and USB data− lines. For example, the SuperSpeed USB differential signal line pairs may allow for up to two bi-directional channels 120, 125 of 10 Gbps operation to realize a 20 Gbps data transfer rate. The first and second bi-directional channels 120, 125 may, however, comprise any suitable channel configured to operate according to a variety of different protocols, such as USB 2.0, 3.0, and 3.1.

In an exemplary embodiment, the first group of two signal line pairs, A, comprising the first current drawing circuitry 130 may comprise a first signal conditioning circuit 310 connected to the four signal lines, A0, A1, A2, and A3. The first signal conditioning circuit 310 may be connected between the first near-end receiver/transmitter pair 135, 140 and the first far-end receiver/transmitter pair 145, 150 to provide signal conditioning functions for signals on the first bi-directional channel 120. For instance, the first signal conditioning circuit 310 may be configured to process data packets received and transmitted between the host device 105 and the sink device 110 over the first bi-directional channel 120 by adjusting signal properties of the data packets for signal level attenuation and noise.

Similarly, the second group of two signal line pairs, B, comprising the second current drawing circuitry 155 may comprise a second signal conditioning circuit 315 connected to the four signal lines, B0, B1, B2, and B3. The second signal conditioning circuit 315 may be connected between the second near-end receiver/transmitter pair 160, 165 and the second far-end receiver/transmitter pair 170, 175 to provide signal conditioning functions for signals on the second bi-directional channel 125. For instance, the second signal conditioning circuit 315 may be configured to process data packets received and transmitted between the host device 105 and the sink device 110 over the second bi-directional channel 125 by adjusting signal properties of the data packets for signal level attenuation and noise.

In various embodiments, each signal conditioning circuit 310, 315 may be configured to maintain or return incoming signals to voltage levels, current transmitting and receiving capabilities, rise/fall timings and other signal properties to meet the requirements of the USB 3.2 protocol. Each signal conditioning circuit 310, 315 may, however, be configured to maintain a variety of different signal properties to meet the requirements of a variety of different protocols.

In an exemplary embodiment, the first group of two signal line pairs, A, comprising the first current drawing circuitry 130 may comprise a near-end receiver detector 320 connected to the signal lines A2, A3 at the near end 220 of the first bi-directional channel 120 and a far-end receiver detector 325 connected to the signal lines A0, A1 at the far end 225 of the first bi-directional channel 120. The far-end receiver detector 325 may be configured to detect when the sink device 110 (or any other external receiving device) is connected to the first bi-directional channel 120. For example, a particular communication protocol, such as a USB 3.2 protocol, may require that the sink device 110 (or any other external receiving device) provide a termination impedance (e.g., via terminating impedance elements). The interface 115 may therefore provide this termination impedance at the near end 220 of the first and second bi-directional channels 120, 125 via termination components 330. The far-end receiver detector 325 may detect the presence or absence of such termination impedance at the far end 225 of the first bi-directional channel 120, and it may then pass this detection information on to the host device 105 (or any other transmitting device) by connecting the termination components 330 to the near end 220 of the first bi-directional channel 120, wherein the termination components 330 have an impedance value matching (i.e., equal to) the detected termination impedance.

The receiver detectors 320, 325 may be configured to detect the presence or absence of the termination impedance at the near end 220 and the far end 225 of the first bi-directional channel 120 by measuring the termination impedance provided by the host device 105 and the sink device 110, respectively, and pass this information on to the control circuitry 195.

For example, if the sink device 110 is detected at the far end 225 of the first and second bi-directional channels 120, 125, i.e., the sink device 110 is connected to the first and second bi-directional channels 120, 125, then the interface 115 may communicate this to the host device 105 by connecting the termination components 330 to the host device 105. The termination components 330 may have any suitable termination impedance 332, e.g., 50 ohms (50Ω).

The first group of two signal line pairs, A, comprising the first current drawing circuitry 130 may also comprise a near-end input signal detector 335 connected to the signal lines A0, A1 at the near end 220 of the first bi-directional channel 120 and a far-end input signal detector 340 connected to signal lines A2, A3 at the far-end 225 of the first bi-directional channel 120. The input signal detectors 335, 340 may comprise a squelch detector for detecting valid signaling levels on the first bi-directional channel 120 or a more complicated data detection circuit. This information may then be passed on to the control circuitry 195.

In an exemplary embodiment, the control circuitry 195 may comprise logic circuitry 345 for receiving various inputs and providing a plurality of control signals, i.e., enable and disable signals, to the various components of the interface 115. The control circuitry 195 may also comprise a state machine 350. The state machine 350 may be configured to receive inputs from various components and from timers 355. The control circuitry 195, including the functionality of the state machine 350, may be implemented using a variety of different logic components, processors, associated configuration data and/or stored programming instructions.

The control circuitry 195 may be connected to the near-end receiver detector 320 and the far-end receiver detector 325. Each receiver detector 320, 325 may be configured to receive and respond to the plurality of control signals sent from the control circuitry 195. For example, in response to receiving an enable signal from the control circuitry 195, each receiver detector 320, 325 may be enabled to draw current. Similarly, in response to receiving a disable signal from the control circuitry 195, each receiver detector 320, 325 may be disabled in a manner that substantially reduces and/or eliminates the current flow therethrough. For instance, a switch, e.g., a transistor, can disable current flow through each receiver detector 320, 325.

The control circuitry 195 may also be connected to the near-end input signal detector 335 and the far-end input signal detector 340. Each input signal detector 335, 340 may be configured to receive and respond to the plurality of control signals sent from the control circuitry 195. For example, in response to receiving an enable signal from the control circuitry 195, each input signal detector 335, 340 may be enabled to draw current. Similarly, in response to receiving a disable signal from the control circuitry 195, each input signal detector 335, 340 may be disabled in a manner that substantially reduces and/or eliminates the current flow therethrough. For instance, a switch, e.g., a transistor, can disable current flow through each input signal detector 335, 340.

The control circuitry 195 may be configured to perform snooping (or monitoring) operations on data packets exchanged between the host device 105 and the sink device 110 during communication-based negotiations. For example, upon an initial power-up of the interface 115, the host device 105 and the sink device 110 may participate in a variety of different communication speed-based negotiations with each other. During communication speed-based negotiations, the host device 105 and the sink device 110 may exchange data packets with each other according to a physical layer protocol (PHY). The data packets exchanged during the communication speed-based negotiations may be obtained via the snooping operation and sent to the decoding circuit 180 where they may then be decoded according to a pre-defined table, e.g., a PHY LBPM Capability definition table as illustrated in Table 1 below. After these data packets have been decoded by the decoding circuit 180, they may then be transmitted to the interface 115 where they may be detected by the receiver 185 in the form of the configuration message 190.

TABLE 1

PHY LBPM Definition

| LBPM Type | | LBPM Subtype | | | | |
|---|---|---|---|---|---|---|
| b0 | b1 | b2 b3 | b4 b5 | | b6 | b7 |
| [b1:b0] = 00:PHY Capability | | [b3:b2] = 00:5 Gbps<br>[b3:b2] = 01:10 Gbps<br>[b3:b2] = 10/11: Reserved | Reserved (00) | | 0: single-lane<br>1: dual-lane | Reserved (00) |
| [b1:b0] = 01:PHY Ready | | x2 re-timer to announce its presence:<br>[b4:b2] = 000: no re-timers<br>[b4:b2] = 001-111: number of re-timers and re-timer address index. Refer to Section E.3.4.2.1 for details. | In single-lane operation Reserved (000000)<br>Reserved (0) | x2 operation:<br>0: UFP<br>1: DFP | x2 opertion:<br>For DFP:<br>0: Config Done. DFP ready to exit<br>1: RT Config. DFP to address re-timers<br>For UFP:<br>Reserved (0) | |
| [b1:b0] = 10/11:Reserved | | | Reserved | | | |

The control circuitry 195 may then send the interface 115 into an operational state by making a selection amongst a first operational state 360 and a second operational state 365 based on instructions provided by the configuration message 190. The control circuitry 195 may be further configured to, in response to the interface 115 having entered the second operational state 365, detect a plurality of power states for the interface 115 and initiate an exemplary power-saving scheme based on the detected power state. In order to initiate the exemplary power-saving scheme, the control circuitry 195 may be further configured to controllably operate the interface 115 by sending the interface 115 into the detected power state, which it may do by enabling and/or disabling portions of the first current drawing circuitry 130 and the second current drawing circuitry 155.

In an exemplary embodiment, the control circuitry 195 may be configured to disable, in response to detecting a first power state 370 being active, portions of the first current drawing circuitry 130 and the second current drawing circuitry 155. For example, when the first power state 370 is active, the first near-end receiver 135 and the first near-end transmitter 140 may be disabled by sending the first near-end disable signal 260 to the first near-end control port 250 and the first far-end receiver 145 and the first far-end transmitter 150 may be disabled by sending the first far-end disable signal 275 to the first far-end control port 265. In addition, the second near-end receiver 160 and the second near-end transmitter 165 may be disabled by sending the second near-end disable signal 290 to the second near-end control port 280 and the second far-end receiver 170 and the second far-end transmitter 175 may be disabled by sending the second far-end disable signal 305 to the second far-end control port 295.

The first power state 370 may be referred to as an unterminated power state, wherein the interface 115 operates in a low current mode. When the first power state 370 is active, each input signal detector 335, 340 may be disabled and each receiver detector 320, 325 may be enabled for performing termination detection at the far end 225 and the near end 220 of the first bi-directional channel 120. As described herein, disabling the second bi-directional channel 125 when the first power state 370 is active may reduce the total current drawn by the interface 115 by approximately sixty milliamperes (60 mA). Furthermore, disabling each input signal detector 335, 340 may reduce the total current drawn by the interface 115 by approximately an additional four milliamperes (4 mA, i.e., 2 mA drawn per input signal detector×2 input signal detectors). Each receiver detector 320, 325 may draw approximately one hundred microamperes (200 µA i.e., 100 uA drawn per receiver detector×2 receiver detectors) of current when enabled during the first power state 370.

In addition, the control circuitry 195 may be configured to enable, in response to detecting a second power state 380 being active, portions of the first current drawing circuitry 130 and the second current drawing circuitry 155. For example, when the second power state 380 is active, the first near-end receiver 135 and the first near-end transmitter 140 may be enabled by sending the first near-end enable signal 255 to the first near-end control port 250 and the first far-end receiver 145 and the first far-end transmitter 150 may be enabled by sending the first far-end enable signal 270 to the first far-end control port 265. In addition, the second near-end receiver 160 and the second near-end transmitter 165 may be enabled by sending the second near-end enable signal 285 to the second near-end control port 280 and the second far-end receiver 170 and the second far-end transmitter 175 may be enabled by sending the second far-end enable signal 300 to the second far-end control port 295.

The second power state 380 may be referred to as an active power state, wherein the interface 115 operates in a high current mode. When the second power state 380 is active, each receiver detector 320, 325 may be disabled and each input signal detector 335, 340 may be enabled for performing detection at the near end 220 and the far end 225 of the first bi-directional channel 120 to determine whether data packets are being received at the near end 220 and the far end 225 of the first bi-directional channel 120. As described herein, the second bi-directional channel 125 may draw approximately sixty milliamperes (60 mA) of current when enabled, and each input signal detector 335, 340 may draw approximately two milliamperes (2 mA) of current when enabled. Each receiver detector 320, 325 may draw approximately one hundred microamperes (100 µA) of current when enabled.

Furthermore, the control circuitry 195 may be further configured to enable, in response to detecting a third power state 390 being active, portions of the first current drawing circuitry 130, and disable, in response to detecting the third power state 390 being active, the second current drawing circuitry 155. The third power state 390 may be a slumber power state, wherein the interface 115 operates in a mid-current mode (wherein the mid-current is between the high current and the low current). For example, when the third power state 390 is active, the control circuitry 195 may send the first near-end disable signal 260 to the first near-end control port 250. Upon receipt of the first near-end disable signal 260 at the first near-end control port 250, the first near-end receiver 135 and the first near-end transmitter 140 may be disabled. The control circuitry 195 may also send the first far-end disable signal 275 to the first far-end control port 265. Upon receipt of the first far-end disable signal 275 at the first far-end control port 265, the first far-end receiver 145 and the first far-end transmitter 150 may be disabled.

In addition, when the third power state 390 is active, the control circuitry 195 may send the second near-end disable signal 285 to the second near-end control port 280. Upon receipt of the second near-end disable signal 285 at the second near-end control port 280, the second near-end receiver 160 and the second near-end transmitter 165 may be disabled. The control circuitry 195 may also send the second far-end disable signal 305 to the second far-end control port 295. Upon receipt of the second far-end disable signal 305 at the second far-end control port 295, the second far-end receiver 170 and the second far-end transmitter 175 may be disabled.

The third power state 390 may also be referred to as an unterminated power state. When the third power state 390 is active, each receiver detector 320, 325 may be enabled for performing termination detection at the far end 225 and the near end 220 of the first bi-directional channel and each input signal detector 335, 340 may be enabled for performing detection at the near end 220 and the far end 225 of the first bi-directional channel 120 to determine whether data packets are being received at the near end 220 and the far end 225 of the first bi-directional channel 120. As described herein, disabling the second bi-directional channel 125 when the third power state 390 is active may reduce the total current drawn by the interface 115 by approximately sixty milliamperes (60 mA). Furthermore, each receiver detector 320, 325 may draw approximately one hundred (100) micro-amperes (100 μA) of current when enabled, and each input signal detector 335, 340 may draw approximately two milliamperes (2 mA) of current when enabled.

In various embodiments of the present technology, the first power state 370 and the third power state 390 may be defined as power saving states. When the interface 115 is operating in one of these power saving states, the first bi-directional channel 120 may be configured to draw less than one hundred micro amperes (100 μA) of current and the second current drawing circuitry 155 may be disabled. Furthermore, when the interface 115 is operating in one of these power saving states, the host device 105 and the sink device 110 may also be operating in one of these power savings states.

In an exemplary operation, the system 100 may operate to perform signal conditioning and the exemplary power-saving scheme simultaneously. For example, while the signal conditioning circuits 310, 315 are performing signal conditioning on data packets being exchanged between the host device 105 and the sink device 110 via each bi-directional channel 120, 125, the control circuitry 195, via the state machine 350 and the timers 355, may control when the various portions of the interface 115 can be powered on or powered off. The state machine 350 may be implemented using programmable state machine logic to control the interface 115.

Figure 3:
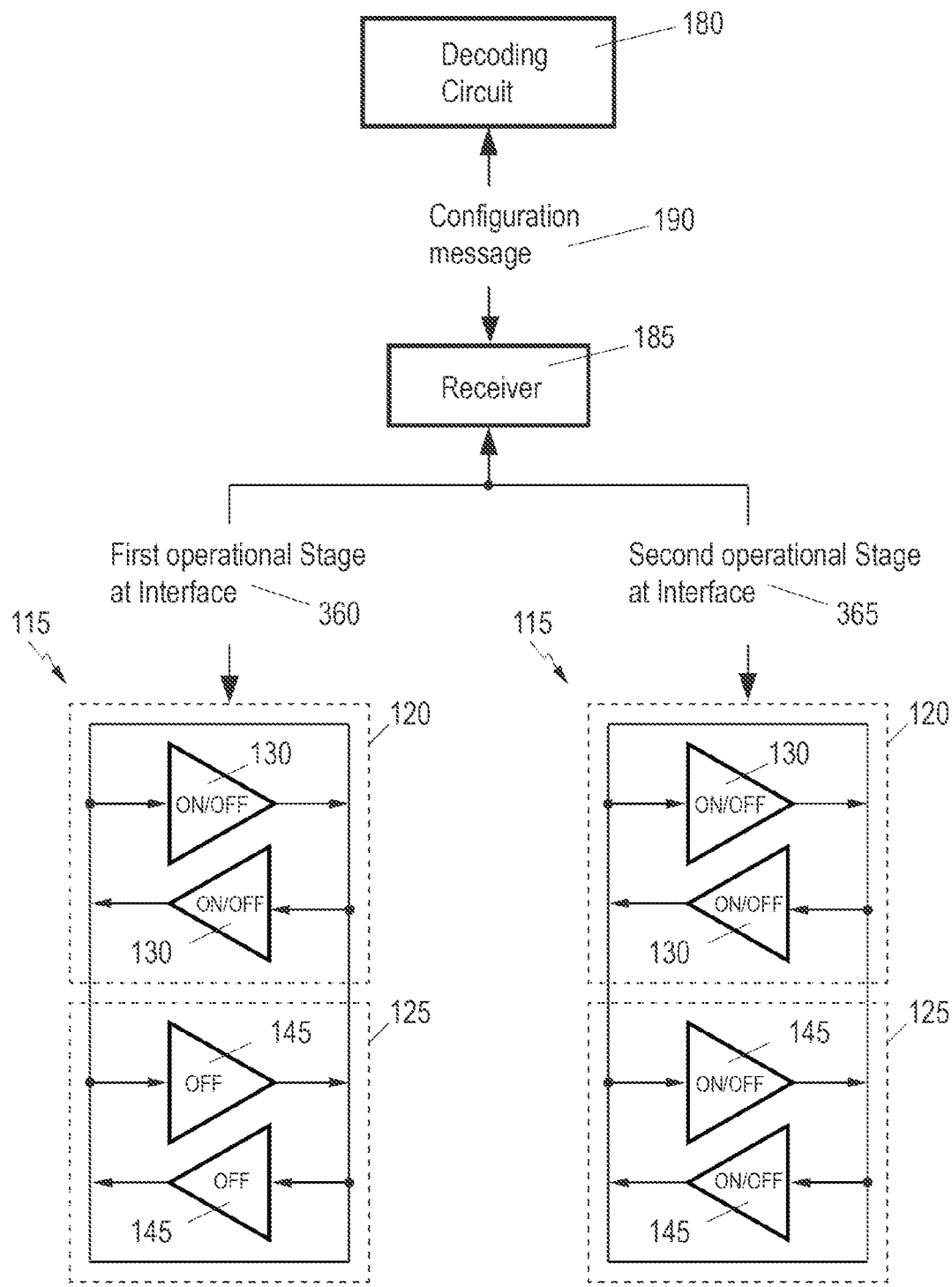
FIG. 3 representatively illustrates a block diagram of a portion of the system in accordance with an exemplary embodiment of the present technology.

Referring to FIG. 3, the system 100 may begin by selecting one of the first operational state 360 and the second operational state 365 based on the instructions provided by the configuration message 190. The configuration message 190 may instruct the interface 115 to enter the first operational state 360 when the host device 105 and the sink device 110 are operating according to a single bi-directional channel protocol, such as a variety of different USB specifications, including USB 3.1/3.0 specification and USB 2.0 specification. The system 100 may, in response to the interface 115 having entered the first operational state 360, detect a plurality of power states for the interface 115 and initiate any suitable power-saving scheme operable with an interface comprising a single bi-directional channel architecture. Performing a suitable power-saving scheme may, for example, involve enabling and/or disabling portions of the first current drawing circuitry 130 while disabling portions of the second current drawing circuitry 155.

The configuration message 190 may instruct the interface 115 to enter the second operational state 365 when the host device 105 and the sink device 110 are operating according to a dual bi-directional channel protocol, such as a USB 3.2 Gen 2×2 specification, which offers a 20 Gbps data rate by using each bi-directional channel 120, 125 to transfer 10 Gbps simultaneously. The system 100 may, in response to the interface 115 having entered the second operational state 365, detect a plurality of power states for the interface 115 and initiate the exemplary power-saving scheme. Performing the exemplary power-saving scheme may involve using a squelch indication and/or actual USB traffic on the first bi-directional channel 120 to determine precisely what state the interface 115 may be in.

Figure 4:
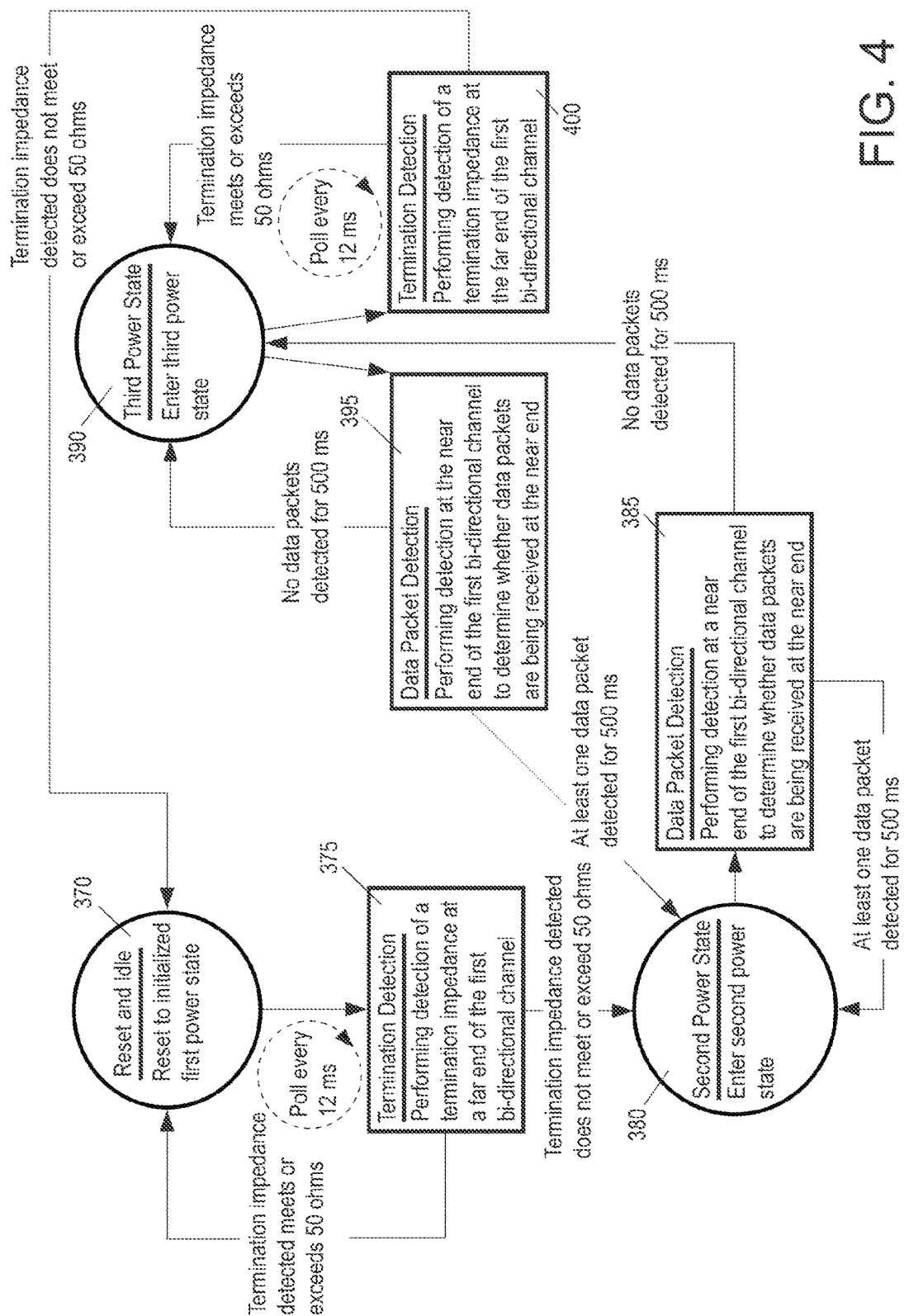
FIG. 4 representatively illustrates a flow diagram for operating the system in accordance with an exemplary embodiment of the present technology.

Referring now to FIGS. 1, 2, and 4, after the second operational state is selected, the system 100 may begin performing the exemplary power-saving scheme in a reset and idle state, i.e., the first power state 370. The host device 105, the sink device 110 and other devices connected to the interface 115 may be initialized to a predetermined known state. After entering the first power state 370, a termination detection state 375 may be entered to perform termination detection at the far end 225 and/or the near end 220 of the first bi-directional channel 120 until termination is detected at the far end 225 and/or the near end 220 of the first bi-directional channel 120. At this point, much of the interface 115 may be disabled since no feed through operation is required. A plurality of receiver detectors, such as receiver detectors 320, 325 may, however, be enabled to perform termination detection at the near end 220 and the far end 225 of the first bi-directional channel 120, respectively. The receiver detectors 320, 325 may perform termination detection at the near end 220 and the far end 225 of the first bi-directional channel 120 by measuring the termination impedance provided by the host device 105 and the sink device 110, respectively. Each device 105, 110 may provide its respective termination impedance when it is connected to the interface 115.

After entering the first power state 370, performing the exemplary power-saving scheme may further comprise continuously performing detection of the termination impedance provided by the sink device 110 at the far end 225 of the first bi-directional channel 120 to re-detect the termination impedance provided by the sink device 110 after a re-detect period of time (e.g., 12 milliseconds) has elapsed, whereby termination detection is continuously repeated after each re-detect period of time until the termination impedance provided by the sink device 110 at the far end 225 of the first bi-directional channel 120 meets or exceeds a threshold termination impedance, e.g., fifty ohms (50Ω). The sink device 110 may be connected to the interface 115 via the signal lines A0, A1 at the far end 225 of the first bi-directional channel 120. When the receiver detector 325 detects termination at the far end 225 of the first bi-directional channel 120, which could happen, for example, where the termination impedance provided by the sink device 110 at the far end 225 of the first bi-directional channel 120 meets or exceeds the threshold termination impedance, the control circuitry 195 may send control signals, i.e., enable/disable signals, to the corresponding termination components 330 located at the near end 220 of the first bi-directional channel 120. Each termination component 330 may be configured to receive and respond to the control signals received from the control circuitry 195. For instance, in response to the termination components 330 receiving enable signals from the control circuitry 195, the interface 115 may be configured to connect the corresponding termination components 330 located at the near end 220 of the first bi-directional channel 120 to the signal lines A0,A1. The interface 115 may then enter the second power state 380.

Similarly, after entering the first power state 370, performing the exemplary power-saving scheme may further comprise continuously performing detection of the termination impedance provided by the host device 105 at the near end 220 of the first bi-directional channel 120 to re-detect the termination impedance provided by the host device 105 after a re-detect period of time (e.g., 12 milliseconds) has elapsed, whereby termination detection is continuously repeated after each re-detect period of time until the termination impedance provided by the host device 105 at the near end 220 of the first bi-directional channel 120 meets or exceeds a threshold termination impedance, e.g., fifty ohms (50Ω). The host device 105 may be connected to the interface 115 via the signal lines A2, A3 at the near end 220 of the first bi-directional channel 120. When the receiver detector 320 detects termination at the near end 220 of the first bi-directional channel 120, which could happen, for example, where the termination impedance provided by the host device 105 at the near end 220 of the first bi-directional channel 120 meets or exceeds the threshold termination impedance, the control circuitry 195 may send control signals, i.e., enable signals, to the corresponding termination components 330 located at the far end 225 of the first bi-directional channel 120. Each termination component 330 may be configured to receive and respond to the control signals received from the control circuitry 195. For instance, in response to the termination components 330 receiving enable signals from the control circuitry 195, the interface 115 may be configured to connect the corresponding termination components 330 at the far end 225 of the first bi-directional channel 120 to the signal lines A2, A3 at the far end 225 of the first bi-directional channel 120. The interface 115 may then enter the second power state 380.

It will be appreciated that modifications may be made to the manner in which the termination components 330 receive and respond to the control signals sent from the control circuitry 195. For example, in various embodiments, each termination component 330 may be configured to receive and respond to its own respective enable signal and disable signal, wherein the enable signal and the disable signal received at the termination components 330 located at the near end 220 of the first bi-directional channel 120 may be different than the enable signal and the disable signal received at the termination components 330 located at the far end 225 of the first bi-directional channel 120. Similarly, the enable signal and the disable signal received at the termination components 330 located at the near end 220 of the second bi-directional channel 125 may be different than the enable signal and the disable signal received at the termination components 330 located at the far end 225 of the second bi-directional channel 125.

After entering the second power state 380, the system 100 may enter a data packet detection state 385 to perform detection at the near end 220 of the first bi-directional channel 120 to determine whether data packets are being received at the near end 220 of the first bi-directional channel 120. During the data packet detection state 385, the host device 105, the sink device 110, and any other external devices connected to the interface may be expected to communicate with each other. This can be accomplished using a training sequence, for example. At this point, in response to receiving a corresponding enable signal from the control circuitry 195, the near-end input signal detector 335, e.g., a squelch monitor, may be enabled for activity detection. If activity is detected, i.e., data packets are detected at the near end 220 of the first bi-directional channel 120, then the interface 115 may assume that a valid signal may be present and the system 100 may then return to the second power state 380. A local timer (not shown) may be used to monitor for this eventuality. At this point, much of the interface 115 may be enabled since feed through operation is required.

After entering the data packet detection state 385, performing the exemplary power-saving scheme may further comprise continuously performing detection at the near end 220 of the first bi-directional channel 120 to determine whether data packets are being received at the near end 220 of the first bi-directional channel 120 until no data packets are detected for a period of time meeting or exceeding a predetermined threshold period of time. When no data packets are detected for the period of time meeting or exceeding the threshold period of time, e.g., 500 milliseconds, the interface 115 may enter the third power state 390.

After entering the third power state 390, performing the exemplary power-saving scheme may further comprise simultaneously: entering a data packet detection state 395 to continuously perform detection at the near end 220 and the far end 225 of the first bi-directional channel 120 to determine whether the data packets are being received at the near end 220 and the far end 225 of the first bi-directional channel 120 until at least one of the data packets is detected for the period of time meeting or exceeding the threshold period of time; and entering a termination detection state 400 to continuously perform detection of the termination impedance provided by the sink device 110 at the far end 225 of the first bi-directional channel 120 to re-detect the termination impedance provided by the sink device 110 at the far end 225 of the first bi-directional channel 120 after the re-detect period of time has elapsed, whereby termination detection is continuously repeated after each re-detect period of time until the termination impedance provided by the sink device 110 at the far end 225 of the first bi-directional channel 120 does not meet or exceed the threshold termination impedance. At this point, in response to receiving a corresponding enable signal from the control circuitry 195, the near-end input signal detector 335 may be enabled for performing activity detection at the near end 220 of the first bi-directional channel 120 and the far-end receiver detector 325 may be enabled for performing termination detection at the far end 225 of the first bi-directional channel 120.

After entering the third power state 390, the interface 115 may be configured to enter the second power state 380 from the third power state 390 after at least one of the data packets is detected at the near end 220 and/or the far end 225 of the first bi-directional channel 120 for the period of time meeting or exceeding the threshold period of time. If activity is detected, i.e., data packets are detected at the near end 220 and/or the far end 225 of the first bi-directional channel 120, then the interface 115 may assume that an error has occurred and the system 100 may then return to the second power state 380. A local timer may be used to monitor for this eventuality. After the interface 115 has entered the second power state 380, the interface 115 may then re-enter the data packet detection state 385.

In addition, the interface 115 may be configured to enter the first power state 370 from the third power state 390 after detecting the termination impedance provided by the sink device 110 at the far end 225 of the first bi-directional channel 120 does not meet or exceed the threshold termination impedance. If it is detected that the termination impedance provided by the sink device 110 at the far end 225 of the first bi-directional channel 120 does not meet or exceed the threshold termination impedance, then the interface 115 may assume that an error has occurred and the system 100 may then return to the first power state 370. A local timer (not shown) may be used to monitor for this eventuality. After the interface 115 has entered the first power state 370, the interface 115 may be configured to restart the exemplary power-saving scheme.

The system 100 may end performing the exemplary power-saving scheme when the host device 105 or the sink device 110 is disconnected from the interface 115. After the host device 105 or the sink device 110 has been disconnected from the interface 115, the system 100 may enter an initial waiting state, wherein the system 100 waits for the interface 115 to be re-configured via the configuration message 190.

In the foregoing description, the technology has been described with reference to specific exemplary embodiments. The particular implementations shown and described are illustrative of the technology and its best mode and are not intended to otherwise limit the scope of the present technology in any way. The description and figures are illustrative, rather than restrictive, and modifications are intended to be included within the scope of the present technology. Accordingly, the scope of the technology should be determined by the generic embodiments described and their legal equivalents rather than by merely the specific examples described.

For example, the steps recited in any method or process embodiment may be executed in any order, unless otherwise expressly specified, and are not limited to the explicit order presented in the specific examples. Additionally, the components and/or elements recited in any apparatus embodiment may be assembled or otherwise operationally configured in a variety of permutations to produce substantially the same result as the present technology and are accordingly not limited to the specific configuration recited in the specific examples.

Benefits, other advantages and solutions to problems have been described above with regard to particular embodiments. Any benefit, advantage, solution to problems or any element that may cause any particular benefit, advantage or solution to occur or to become more pronounced, however, is not to be construed as a critical, required or essential feature or component.

The terms "comprises", "comprising", or any variation thereof, are intended to reference a non-exclusive inclusion, such that a process, method, article, composition or apparatus that comprises a list of elements does not include only those elements recited, but may also include other elements not expressly listed or inherent to such process, method, article, composition or apparatus. Other combinations and/or modifications of the above-described structures, arrangements, applications, proportions, elements, materials or components used in the practice of the present technology, in addition to those not specifically recited, may be varied or otherwise particularly adapted to specific environments, manufacturing specifications, design parameters or other operating requirements without departing from the general principles of the same.

The present technology has been described above with reference to an exemplary embodiment. However, changes and modifications may be made to the exemplary embodiment without departing from the scope of the present technology. These and other changes or modifications are intended to be included within the scope of the present technology, as expressed in the following claims.

The invention claimed is:

1. A method for operating an interface having a first bi-directional channel and a second bi-directional channel, comprising:
    selecting one of a first operational state and a second operational state; and
    if the second operational state is selected, performing a power-saving scheme, comprising:
        entering a first power state;
        after entering the first power state, performing detection of a termination impedance provided by an external device connected to the interface at a far end of the first bi-directional channel;
        entering a second power state from the first power state in response to detecting the termination impedance provided by the external device connected to the interface at the far end of the first bi-directional channel meets or exceeds a threshold termination impedance;
        after entering the second power state, performing detection at a near end of the first bi-directional channel to determine whether data packets are being received at the near end of the first bi-directional channel;
        entering a third power state from the second power state in response to determining that no data packets are being received at the near end of the first bi-directional channel for a period of time meeting or exceeding a threshold period of time; and
        after entering the third power state, simultaneously: performing detection at the near end of the first bi-directional channel to determine whether the data packets are being received at the near end of the first bi-directional channel, and performing detection of the termination impedance provided by the external device connected to the interface at the far end of the first bi-directional channel.

2. The method according to claim 1, wherein performing the power-saving scheme further comprises:
    after entering the first power state, continuously performing detection of the termination impedance provided by the external device connected to the interface at the far end of the first bi-directional channel to re-detect the termination impedance provided by the external device after a re-detect period of time has elapsed, whereby termination detection is continuously repeated after each re-detect period of time until the termination impedance provided by the external device connected to the interface at the far end of the first bi-directional channel meets or exceeds the threshold termination impedance;

after entering the second power state, continuously performing detection at the near end of the first bi-directional channel to determine whether the data packets are being received at the near end of the first bi-directional channel until no data packets are detected for the period of time meeting or exceeding the threshold period of time; and after entering the third power state, simultaneously:
continuously performing detection at the near end of the first bi-directional channel to determine whether the data packets are being received at the near end of the first bi-directional channel until at least one of the data packets is detected for the period of time meeting or exceeding the threshold period of time; and continuously performing detection of the termination impedance provided by the external device connected to the interface at the far end of the first bi-directional channel to re-detect the termination impedance provided by the external device after the re-detect period of time has elapsed, whereby termination detection is continuously repeated after each re-detect period of time until the termination impedance provided by the external device connected to the interface at the far end of the first bi-directional channel does not meet or exceed the threshold termination impedance.

3. The method according to claim 2, wherein performing the power-saving scheme further comprises:
entering the second power state from the third power state after at least one of the data packets is detected at the near end of the first bi-directional channel for the period of time meeting or exceeding the threshold period of time; and entering the first power state from the third power state after detecting the termination impedance provided by the external device connected to the interface at the far end of the first bi-directional channel does not meet or exceed the threshold termination impedance.

4. The method according to claim 1, wherein performing the power-saving scheme further comprises:
in response to entering the first power state, disabling current drawing circuitry of the first and second bi-directional channels;

in response to entering the second power state, enabling current drawing circuitry of the first and second bi-directional channels; and in response to entering the third power state, enabling current drawing circuitry of the first bi-directional channel, and disabling current drawing circuitry of the second bi-directional channel.

5. The method according to claim 1, wherein the first power state is an unterminated power state, the second power state is an active power state, and the third power state is a slumber power state.

6. The method according to claim 5, wherein the slumber power state is a power saving state, and wherein the first bi-directional channel is configured to consume less than one hundred micro amperes of current when operating in the power saving state.

7. The method according to claim 1, wherein the first and second bi-directional channels are USB 3.2 channels.

8. The method according to claim 1, wherein:
selecting the first operational state further comprises:

in response to entering the second power state or the third power state, enabling current drawing circuitry of the first bi-directional channel;

in response to entering the first power state, disabling current drawing circuitry of the second bi-directional channel; and in response to entering any power state, disabling current drawing circuitry of the second bi-directional channel; and selecting the second operational state further comprises:
in response to entering the second power state or the third power state, enabling current drawing circuitry of the first bi-directional channel;

in response to entering the first power state, disabling current drawing circuitry of the first bi-directional channel;

in response to entering the second power state, enabling current drawing circuitry of the second bi-directional channel based on a level of activity on the first bi-directional channel; and in response to entering the first power state or the third power state, disabling current drawing circuitry of the second bi-directional channel based on a level of activity on the first bi-directional channel.

9. An interface circuit, comprising:
a first bi-directional channel having a first control port configured to receive a first enable signal and a first disable signal;

a second bi-directional channel having a second control port configured to receive a second enable signal and a second disable signal;

a receiver configured to receive a configuration message; and control circuitry configured to:
detect a plurality of power states for the interface circuit, the plurality of power states comprising a first power state, a second power state, and a third power state;

initiate a power-saving scheme based on the detected power state, comprising:
in response to detecting the first power state, disable current drawing circuitry of the first and second bi-directional channels by sending the first disable signal to the first control port and the second disable signal to the second control port;

in response to detecting the second power state, enable current drawing circuitry of the first and second bi-directional channels by sending the first enable signal to the first control port and the second enable signal to the second control port;

in response to detecting a third power state, enable current drawing circuitry of the first bi-directional channel by sending the first disable signal to the first control port, and disable current drawing circuitry of the second bi-directional channel by sending the second disable signal to the second control port.

10. The interface circuit according to claim 9, wherein the configuration message is an in-band pulse width modulation message.

11. The interface circuit according to claim 9, wherein the interface circuit is configured to enter one of a first operational state and a second operational state based on the configuration message received at the receiver, and wherein:
if the first operational state is entered, the interface circuit is further configured to:

in response to entering the second power state or the third power state, enable the current drawing circuitry of the first bi-directional channel;

in response to entering the first power state, disable the current drawing circuitry of the first bi-directional channel; and in response to entering any power state, disable the current drawing circuitry of the second bi-directional channel; and if the second operational state is entered, the interface circuit is further configured to:

in response to entering the second power state or the third power state, enable the current drawing circuitry of the first bi-directional channel;

in response to entering the first power state, disable the current drawing circuitry of the first bi-directional channel;

in response to entering the second power state, enable the current drawing circuitry of the second bi-directional channel based on a level of activity on the first bi-directional channel; and in response to entering the first power state or the third power state, disable the current drawing circuitry of the second bi-directional channel based on a level of activity on the first bi-directional channel.

12. The interface circuit according to claim 9, wherein the current drawing circuitry comprises at least one of a receiver detector, a transmitter detector, a receiver equalizer, a transmit buffer, a receive buffer, a termination component, an input detection component, or an output detection component.

13. The interface circuit according to claim 9, wherein the first and second bi-directional channels are USB 3.2 channels.

14. The interface circuit according to claim 9, wherein the control circuitry comprises a timer and is configured to function as a state machine that responds to the timer.

15. The interface circuit according to claim 14, wherein the control circuitry is further configured to controllably operate the interface circuit by sending the interface circuit into the first power state, the second power state, and the third power state; wherein the first power state is an unterminated power state, the second power state is an active power state, and the third power state is a slumber power state, the slumber power state being a power saving state; and wherein the first bi-directional channel is configured to consume less than one hundred micro amperes of current when operating in the power saving state.

16. A system comprising:
a host device;
a sink device;
a decoding circuit; and
an interface connected between the host device and the sink device, wherein the interface comprises:
a first bi-directional channel having a first control port configured to receive a first enable signal and a first disable signal and a second bi-directional channel having a second control port configured to receive a second enable signal and a second disable signal, wherein the first and second bi-directional channels are configured to receive data packets;
a receiver configured to receive a configuration message from the decoding circuit; and
control circuitry configured to:
detect a plurality of power states for the interface;
disable, in response to detecting a first power state being active, current drawing circuitry of the first and second bi-directional channels by sending the first disable signal to the first control port and the second disable signal to the second control port;
enable, in response to detecting a second power state being active, current drawing circuitry of the first and second bi-directional channels by sending the first enable signal to the first control port and the second enable signal to the second control port; and
enable in response to detecting a third power state being active, current drawing circuitry of the first bi-directional channel by sending the first disable signal to the first control port, and disable, in response to detecting the third power state being active, current drawing circuitry of the second bi-directional channel by sending the second disable signal to the second control port.

17. The system according to claim 16, wherein the interface is further configured to:
perform a snooping operation on data exchanged between the host device and the sink device during communication speed-based negotiations occurring over a communication medium according to a physical layer protocol (PHY);
decode the data by the decoding circuit according to a PHY definition table;
transmit the decoded data to the interface in the form of the configuration message; and
enter an operational state at the interface by making a selection amongst a first operational state and a second operational state in response to receiving the configuration message at the receiver, and wherein:
if the first operational state is entered, the interface is further configured to:
in response to entering the second power state or the third power state, enable the current drawing circuitry of the first bi-directional channel;
in response to entering the first power state, disable the current drawing circuitry of the first bi-directional channel; and
in response to entering any power state, disable the current drawing circuitry of the second bi-directional channel; and
if the second operational state is entered, the interface is further configured to:
in response to entering the second power state or the third power state, enable the current drawing circuitry of the first bi-directional channel;
in response to entering the first power state, disable the current drawing circuitry of the first bi-directional channel;
in response to entering the second power state, enable the current drawing circuitry of the second bi-directional channel based on a level of activity on the first bi-directional channel; and
in response to entering the first power state or the third power state, disable the current drawing circuitry of the second bi-directional channel based on a level of activity on the first bi-directional channel.

18. The system according to claim 16, wherein the first and second bi-directional channels are USB 3.2 channels.

19. The system according to claim 16, wherein the control circuitry comprises a timer and is further configured to function as a state machine that responds to the timer and controllably operate the interface by sending the interface into:

the first power state after the interface receives the configuration message from the decoding circuit;

the first power state from the third power state after detecting a termination impedance provided by the sink device connected to the interface at a far end of the first bi-directional channel does not meet or exceed a threshold termination impedance;

the second power state from the first power state in response to detecting the termination impedance provided by the sink device connected to the interface at the far end of the first bi-directional channel meets or exceeds the threshold termination impedance;

the second power state from the third power state after performing detection and determining that data packets are being received at a near end of the first-directional channel for a period of time meeting or exceeding a threshold period of time; and the third power state from the second power state in response to determining that no data packets are being received at the near end of the first bi-directional channel for the period of time meeting or exceeding the threshold period of time;

wherein:

the far end of the first bi-directional channel is an end of the first bi-directional channel that is farthest away from the host device; and the near end of the first bi-directional channel is an end of the first bi-directional channel that is closest to the host device.

20. The system according to claim 16, wherein the first power state is an unterminated power state, the second power state is an active power state, and the third power state is a slumber power state, wherein the slumber power state is a power saving state, and wherein the first bi-directional channel is configured to consume less than one hundred micro amperes of current when operating in the power saving state.

* * * * *